United States Patent
Rimini et al.

(10) Patent No.: US 9,252,831 B2
(45) Date of Patent: Feb. 2, 2016

(54) MULTI-TAP ADAPTIVE FILTER FOR TRANSMIT SIGNAL LEAKAGE CANCELLATION

(71) Applicant: QUALCOMM Incorporated, San Diego, CA (US)

(72) Inventors: Roberto Rimini, San Diego, CA (US); Cong T Nguyen, San Diego, CA (US); Peter D Heidmann, San Diego, CA (US); Joseph Patrick Burke, Glenview, IL (US); Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 13/782,366

(22) Filed: Mar. 1, 2013

(65) Prior Publication Data

US 2014/0247757 A1    Sep. 4, 2014

(51) Int. Cl.
*H04B 1/56* (2006.01)
*H04B 1/44* (2006.01)
*H04B 1/525* (2015.01)

(52) U.S. Cl.
CPC . *H04B 1/44* (2013.01); *H04B 1/525* (2013.01)

(58) Field of Classification Search
None
See application file for complete search history.

(56) References Cited

U.S. PATENT DOCUMENTS

| | | | |
|---|---|---|---|
| 7,711,329 B2 | 5/2010 | Aparin et al. | |
| 7,843,859 B1 | 11/2010 | Gregorian et al. | |
| 7,907,891 B2 | 3/2011 | Proctor, Jr. et al. | |
| 8,023,921 B2 | 9/2011 | Lackey | |
| 8,050,201 B2 | 11/2011 | Kahrizi et al. | |
| 8,077,859 B1 | 12/2011 | Xiaopeng et al. | |
| 2003/0126170 A1 | 7/2003 | Ling et al. | |
| 2004/0151238 A1* | 8/2004 | Masenten | 375/219 |
| 2005/0107051 A1* | 5/2005 | Aparin et al. | 455/126 |
| 2006/0176948 A1* | 8/2006 | Lee | 375/233 |
| 2007/0249304 A1* | 10/2007 | Snelgrove et al. | 455/127.2 |
| 2008/0039045 A1* | 2/2008 | Filipovic et al. | 455/295 |
| 2008/0225930 A1* | 9/2008 | Proctor et al. | 375/214 |
| 2008/0225931 A1* | 9/2008 | Proctor et al. | 375/214 |
| 2009/0186582 A1* | 7/2009 | Muhammad et al. | 455/63.1 |
| 2010/0142604 A1 | 6/2010 | Azenkot | |
| 2010/0165895 A1* | 7/2010 | Elahi et al. | 370/290 |
| 2010/0279617 A1* | 11/2010 | Osman | 455/63.1 |
| 2011/0116403 A1 | 5/2011 | Kahrizi et al. | |
| 2011/0195672 A1* | 8/2011 | Pratt et al. | 455/78 |

(Continued)

FOREIGN PATENT DOCUMENTS

WO    2006068635 A1    6/2006
WO    2009156510 A2    12/2009

OTHER PUBLICATIONS

International Search Report and Written Opinion—PCT/US2014/017818—ISA/EPO—May 9, 2014.

(Continued)

*Primary Examiner* — Otis L Thompson, Jr.
(74) *Attorney, Agent, or Firm* — Arent Fox LLP

(57) ABSTRACT

Exemplary embodiments are directed to systems, devices, and methods for mitigating effects of transmit signal leakage. A transceiver may include a transmitter and a receiver. The transceiver may further include a multi-tap analog adaptive filter coupled to each of the transmitter and the receiver and configured to generate an estimated transmit leakage signal based on at least a portion of a transmit signal from the transmitter and an error signal from the receiver.

26 Claims, 13 Drawing Sheets

(56) References Cited

U.S. PATENT DOCUMENTS

| | | | |
|---|---|---|---|
| 2011/0216815 A1* | 9/2011 | Choi et al. | H04B 1/525 375/219 |
| 2012/0140860 A1 | 6/2012 | Rimini et al. | |
| 2013/0044791 A1* | 2/2013 | Rimini et al. | 375/219 |
| 2013/0343440 A1* | 12/2013 | Negus et al. | 375/219 |
| 2014/0269863 A1* | 9/2014 | Fan et al. | 375/221 |

OTHER PUBLICATIONS

Aparin, et al., "An integrated LMS adaptive filter of TX leakage for CDMA receiver front ends", IEEE Journal of Solid-State Circuits, vol. 41, No. 5, 2006, pp. 1171-1182.

\* cited by examiner (a)

(b)

(c)

MULTI-TAP ADAPTIVE FILTER FOR TRANSMIT SIGNAL LEAKAGE CANCELLATION

BACKGROUND

1. Field

The present invention relates generally to transmit signal leakage. More specifically, the present invention relates to systems, devices, and methods for mitigating the effects of transmit signal leakage in a wireless full-duplex communication system.

2. Background

A wireless device in a wireless full-duplex communication system can simultaneously transmit and receive data for two-way communication. One such full-duplex system is a Code Division Multiple Access (CDMA) system. On a transmit path, a transmitter within the wireless device may modulate data onto a radio-frequency (RF) carrier signal to generate an RF modulated signal and amplify the RF modulated signal to obtain a transmit signal having the proper signal level. The transmit signal may be routed via a duplexer and transmitted from an antenna to one or more base stations. On a receive path, a receiver within the wireless device may obtain a received signal via the antenna and duplexer and amplify, filter, and frequency down-convert the received signal to obtain baseband signals, which are further processed to recover data transmitted by the base station(s).

For a full-duplex wireless device, the RF circuitry in the receiver is often subjected to interference from the transmitter. For example, a portion of the transmit signal typically leaks from the duplexer to the receiver, and the leaked signal (which is commonly referred to as a "transmit leakage" signal or a "transmit signal leakage") may cause interference to a desired signal within the received signal. Since the transmit signal and the desired signal typically reside in two different frequency bands, the TX leakage signal can normally be filtered out. However, at large transmit signal power levels and using practical small size RF filters, a residual transmit leakage signal may be present at the receiver. Additionally, any transmit leakage signal may interact with a "jammer" (which is a large amplitude undesired signal close in frequency to the desired signal) to generate "cross modulation" distortion components. Distortion components that fall within the signal band of the desired signal and which are not filtered out act as additional noise that may degrade performance.

A need exists for mitigating the effects of transmit signal leakage. More specifically, a need exists for systems, devices, and methods for mitigating the effects of transmit signal leakage in a wireless full-duplex communication system.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Exemplary embodiments, as described herein, are directed to devices, systems, and methods for mitigating transmit signal leakage effects within a transceiver of a wireless full-duplex communication system. According to various exemplary embodiments, as described herein, a transceiver may include a transmitter, a receiver, and a multi-tap adaptive filter. The multi-tap adaptive filter may be coupled to each of the transmitter and the receiver and configured to generate an estimated transmit leakage signal based on at least a portion of a transmit signal from the transmitter and an error signal from the receiver. Other aspects, as well as features and advantages of various aspects, of the present invention will become apparent to those of skill in the art though consideration of the ensuing description, the accompanying drawings and the appended claims.

Figure 1:
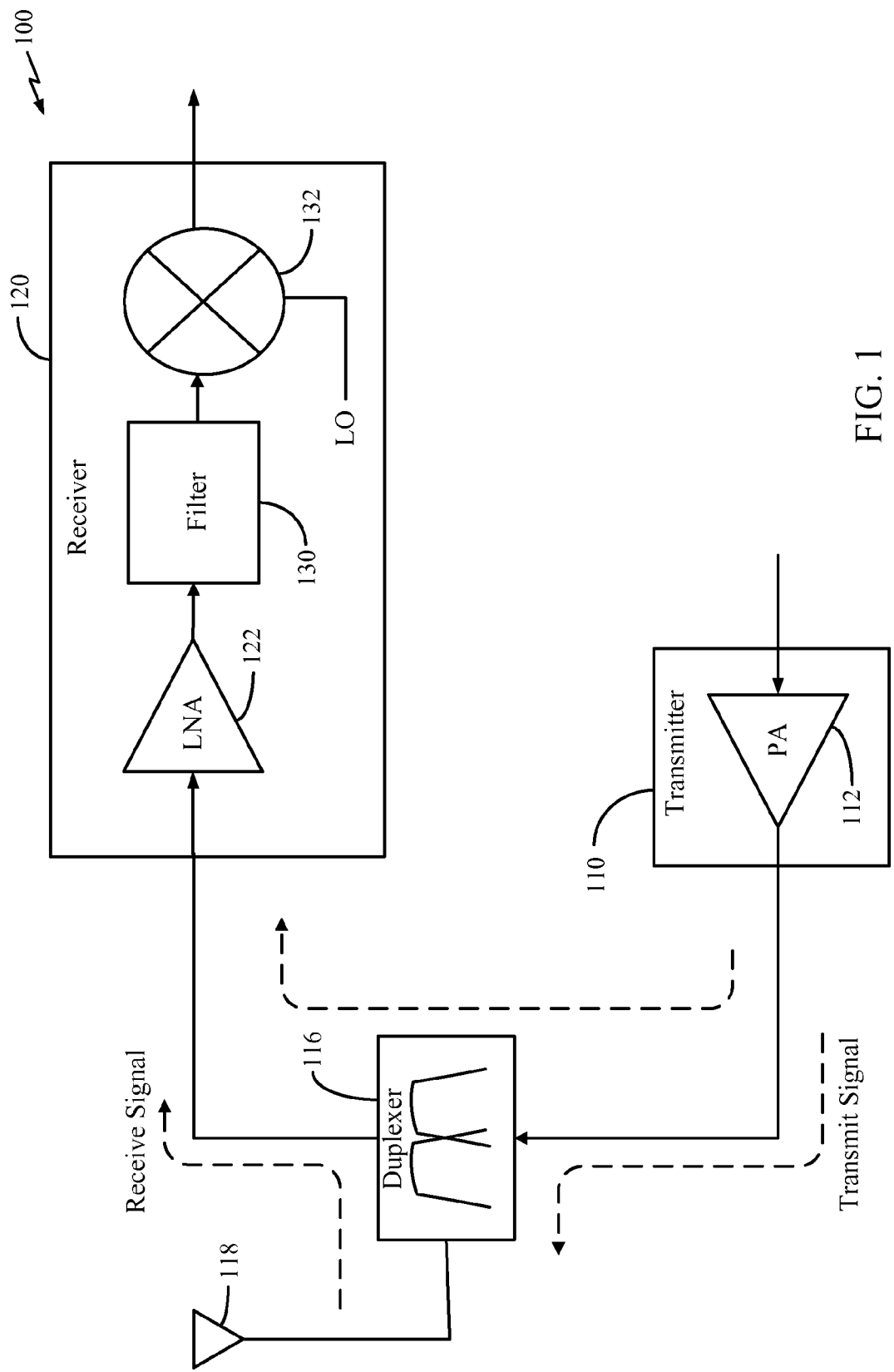
FIG. 1 is a block diagram of an RF portion of a wireless device.

FIG. 1 is a block diagram of an RF portion of a wireless device 100. Within a transmit path, a power amplifier (PA) 112 within a transmitter 110 receives and amplifies a TX modulated signal and provides a transmit signal. The transmit signal is routed through a duplexer 116 and transmitted via an antenna 118. A portion of the transmit signal may also couple or leak through duplexer 116 to a receive path. An amount of transmit signal leakage is dependent on the isolation between transmit and receive ports of duplexer 116, which may be approximately 50 dB for a SAW duplexer at the cellular band. A lower transmit-receive isolation results in a higher level of transmit signal leakage.

Within a receive path, a receive signal containing a desired signal and possibly a jammer is received via antenna 118, routed through duplexer 116, and provided to a low-noise amplifier (LNA) 122 within a receiver 120. LNA 122 also receives a transmit leakage signal from the transmit path, amplifies the receiver input signal at its input, and provides an amplified RF signal to filter 130. Filter 130 receives and filters the amplified RF signal to attempt to remove out of band signal components (e.g., the transmit leakage signal) and provides a filtered RF signal to a mixer 132. Mixer 132 receives and frequency down-converts the filtered RF signal with a local oscillator (LO) signal and provides a down-converted signal.

Figure 2:
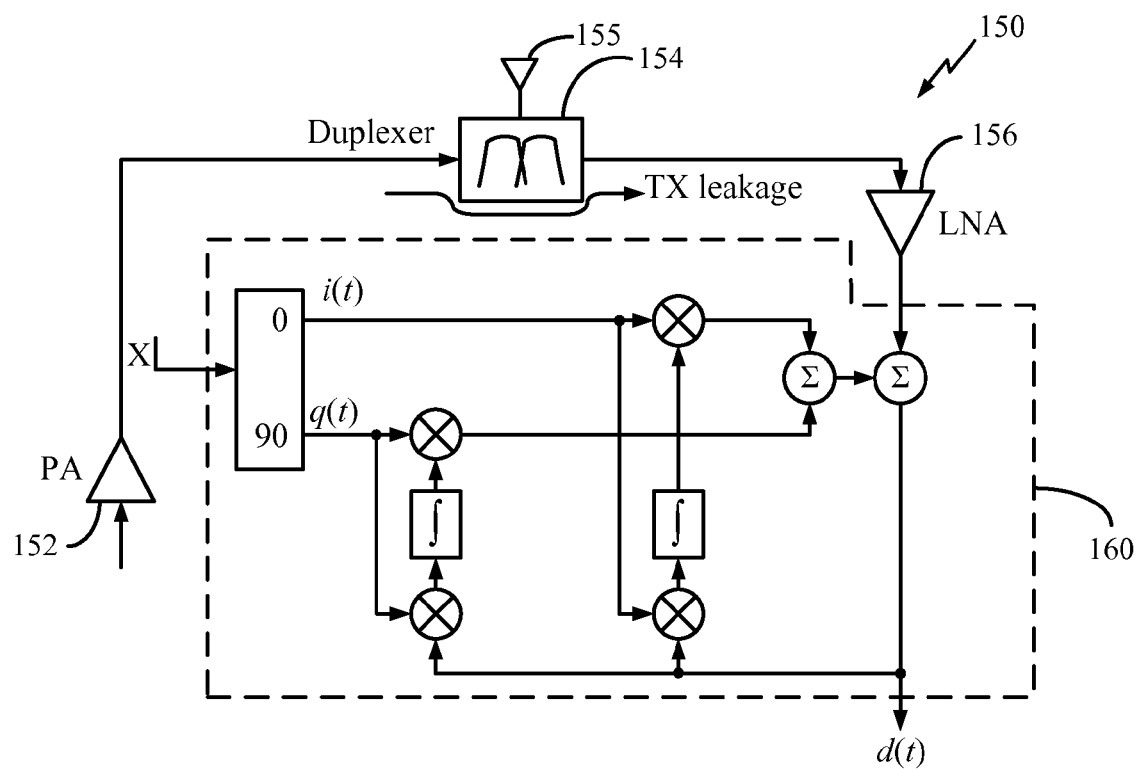
FIG. 2 illustrates a transceiver including a single-tap adaptive filter.

FIG. 2 illustrates a transceiver 150 including a transmit path including a power amplifier 152, a duplexer 154, and an antenna 155. Further, transceiver 150 includes a receive path comprising antenna 155, duplexer 154, and an LNA 156. As will be appreciated, a portion of a transmit signal sent via the transmit path may leak through duplexer 116 to the receive path. Transceiver 150 further includes a single-tap least means square (LMS) adaptive filter 160 configured to reconstruct an estimate of the magnitude and phase of a transmit leakage signal and subtract the estimated transmit leakage signal from the receive path.

Figure 3:
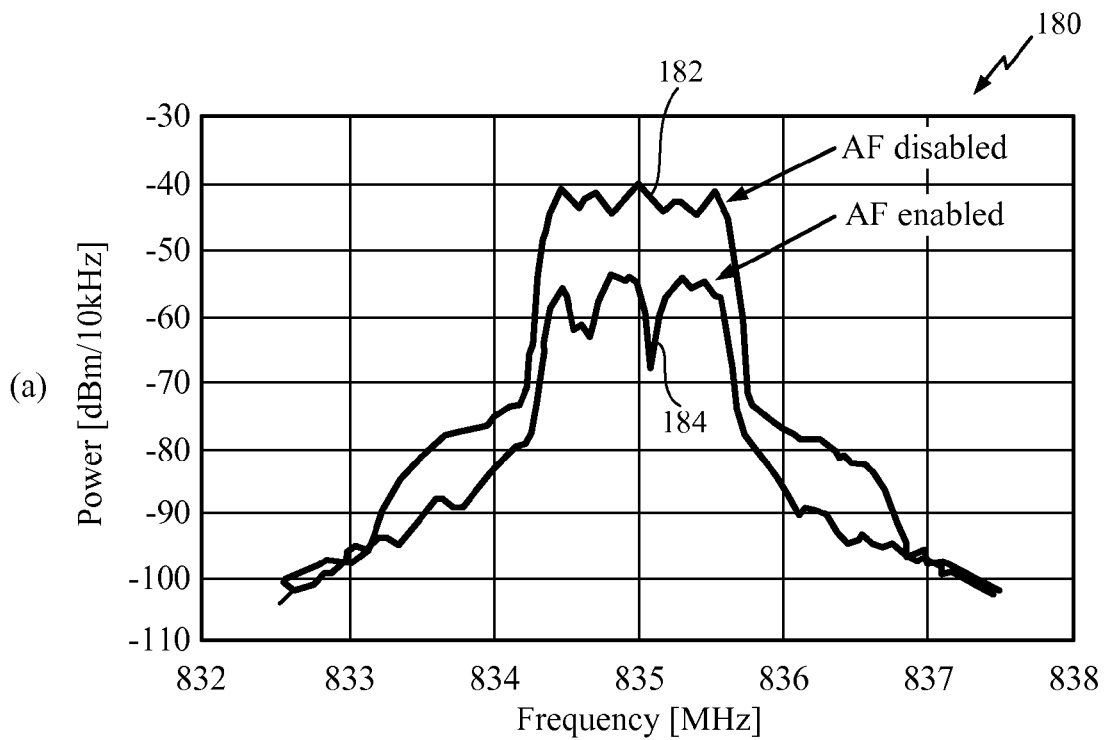
FIG. 3 is a plot depicting a response of a single-tap adaptive filter.

FIG. 3 is a plot 180 illustrating measurement results of a transceiver (e.g., transceiver 150) wherein waveform 182 illustrates a frequency response with an adaptive filter (e.g., LMS adaptive filter 160) disabled and waveform 184 illustrates a frequency response with the adaptive filter enabled. As illustrated in plot 180, although cancellation exists across the depicted frequency range (i.e., comparing waveform 184 to waveform 182), adequate cancellation only exists at one frequency (i.e., at approximately 835.1 MHz).

Figure 4:
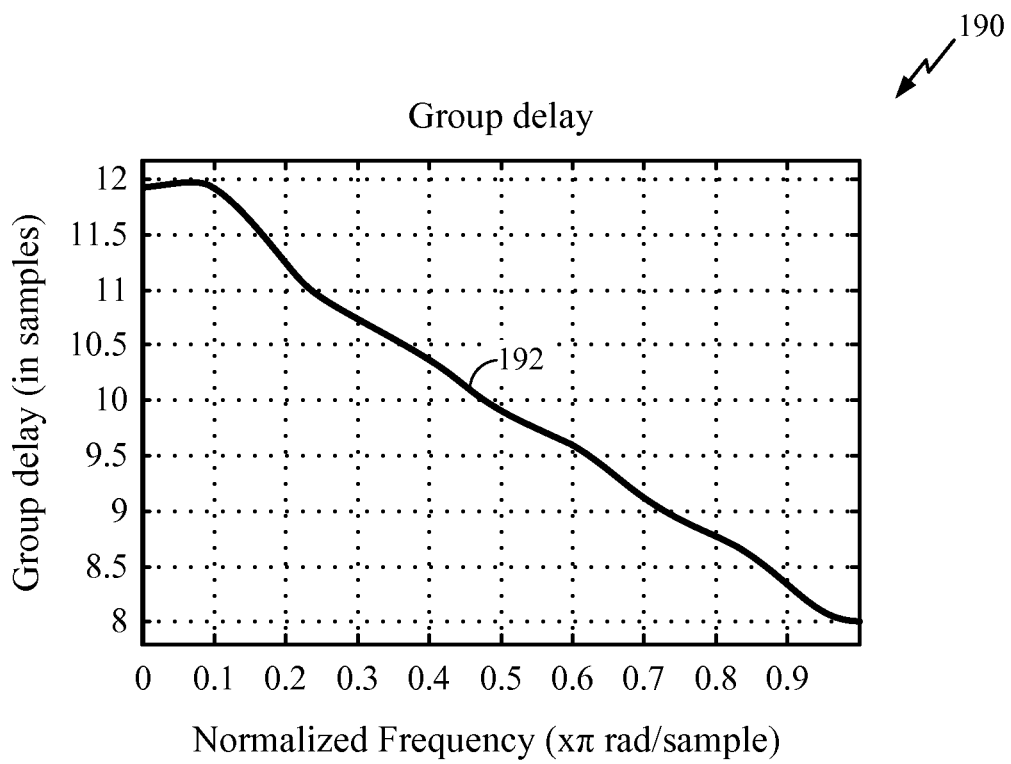
FIG. 4 is a plot illustrating a group delay of transceiver relative to operating frequency.
Figure 5:
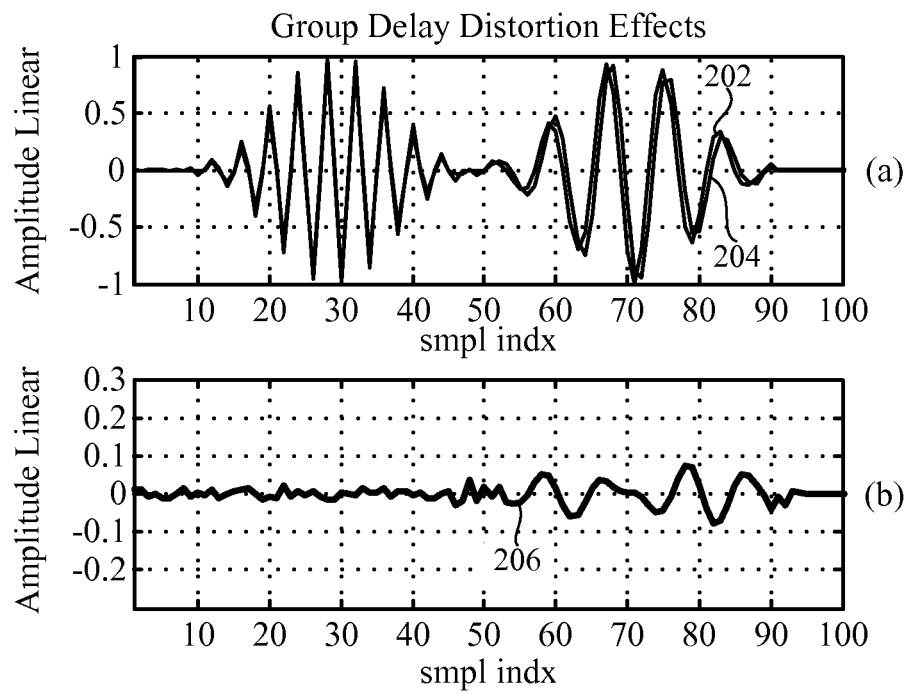
FIG. 5(a) is a plot illustrating a measured transmit leakage signal and a reconstructed transmit leakage signal of a transceiver including single-tap adaptive filter.
FIG. 5(b) is a plot illustrated a residual signal after transmit signal leakage cancellation within a single-tap adaptive filter.

FIG. 4 is a plot 190 illustrating a waveform 192, which depicts a group delay of a transceiver (e.g., transceiver 150) relative to frequency. As illustrated in plot 190, waveform 192 is not perfectly linear. As will be understood, a single-tap adaptive filter includes only one degree of freedom for reconstructing a single frequency. Accordingly, a single-tap adaptive filter may not be configured for reconstructing amplitude variation or group delay variation at more than one frequency. Further, with reference to FIG. 5(a), a waveform 202 illustrates a transmit leakage signal measured at an output of a duplexer (e.g., duplexer 154 of FIG. 2) and a waveform 204 illustrates a reconstructed transmit leakage signal at an output of a single-tap LMS adaptive filter (e.g., LMS adaptive filter 160). Further, a residual signal 206 (i.e., resulting from transit signal leakage cancellation) is illustrated in FIG. 5(b). As illustrated in FIG. 5(a), waveform 204 follows waveform 202 precisely on the left-hand side of FIG. 5(a). However, on the right-hand side of FIG. 5(a), a mismatch exists between the measured transmit leakage signal (i.e., waveform 202) and the reconstructed transmit leakage signal (i.e., waveform 204).

Figure 6:
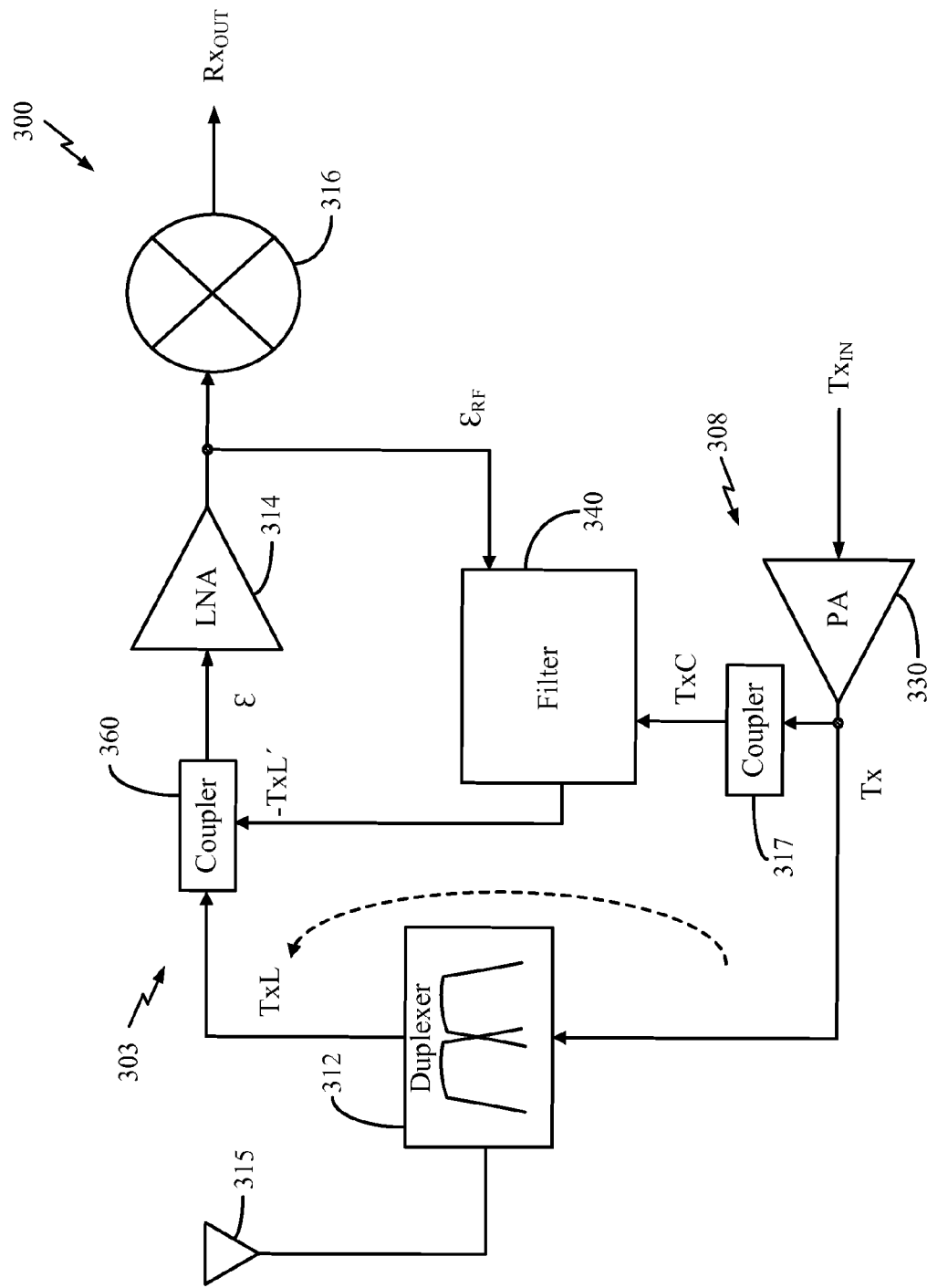
FIG. 6 is a block diagram of a transceiver including a multi-tap adaptive filter, according to an exemplary embodiment of the present invention.

FIG. 6 shows a block diagram of a transceiver 300 including an adaptive filter 340 for transmit signal leakage mitigation, in accordance with an exemplary embodiment of the present invention. Within a transmit path of a transmitter 308, a transmit modulated signal $Tx_{IN}$ is amplified by a power amplifier 330 to generate transmit signal Tx, which is routed through a duplexer 312, and transmitted via an antenna 315. A coupler 317, which is coupled to an output of power amplifier 330, is configured to receive transmit signal Tx from power amplifier 330 and convey a coupler transmit signal TxC to filter 340. As described more fully below, coupler 317 may be configured to convey all frequencies of transmit signal Tx to filter 340 or selectively pass one or more harmonics of transmit signal Tx to filter 340.

On a receive path, a received signal, is received via antenna 315, routed through duplexer 312, and provided to coupler 360 within a receive path 303. It is noted that the signal provided to coupler 360 from duplexer 312 may also possibly include transmit signal leakage TxL from the transmit path and noise. Accordingly, the signal provided to coupler 360 and originating from duplexer 312 may be referred to herein as a "composite signal." Coupler 360 may be configured to receive the composite signal and a signal generated by adaptive filter 340 and generate an error signal ϵ. An LNA 314 may be configured to receive error signal ϵ from coupler 360, amplify the signal at its input, and provide a radio-frequency (RF) error signal $\epsilon_{RF}$. RF error signal $\epsilon_{RF}$ may be conveyed to a mixer 316, which may generate an output signal $Rx_{OUT}$. RF error signal $\epsilon_{RF}$ may also be conveyed to adaptive filter 340.

Furthermore, according to an exemplary embodiment of the present invention, upon receipt of RF error signal $\epsilon_{RF}$ and coupler transmit signal TxC, adaptive filter 340 is configured to generate a reconstructed transmit signal leakage −TxL', which may be conveyed to coupler 360. Further, coupler 360 is configured to, for example, sum the reconstructed transmit signal leakage −TxL' and the composite signal, which may include the transmit signal leakage TxL, to mitigate the effects of transmit signal leakage. In general, adaptive filter 340 may be positioned at any point on the receive path. For example, adaptive filter 340 may be positioned either before or after LNA 314. Improved noise performance can typically be achieved with adaptive filter 340 positioned after LNA 314. As described more fully below, adaptive filter 340 is configured to generate a plurality of coefficients (i.e., weights) for adaptively estimating magnitude and phase of a transmit signal leakage.

Figure 7:
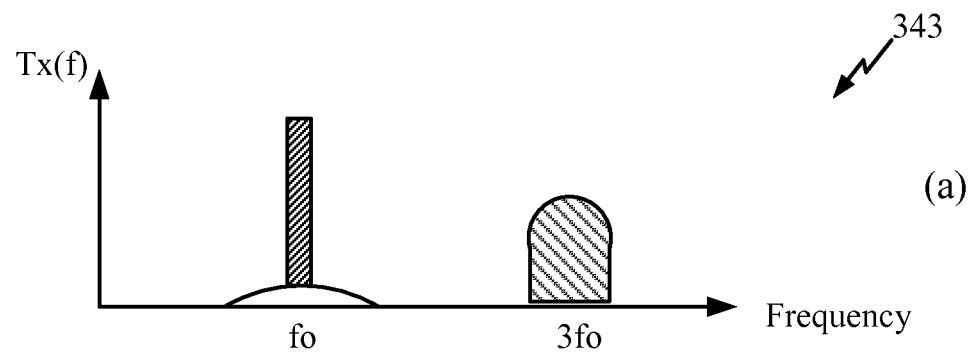
FIGS. 7(a)-7(c) are plots illustrating various signals related to an operation of a coupler, according to an exemplary embodiment of the present invention.
Figure 7:
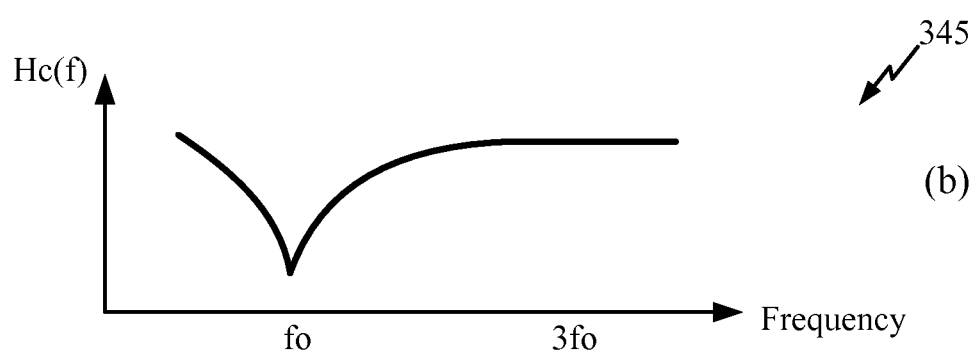
Figure 7:
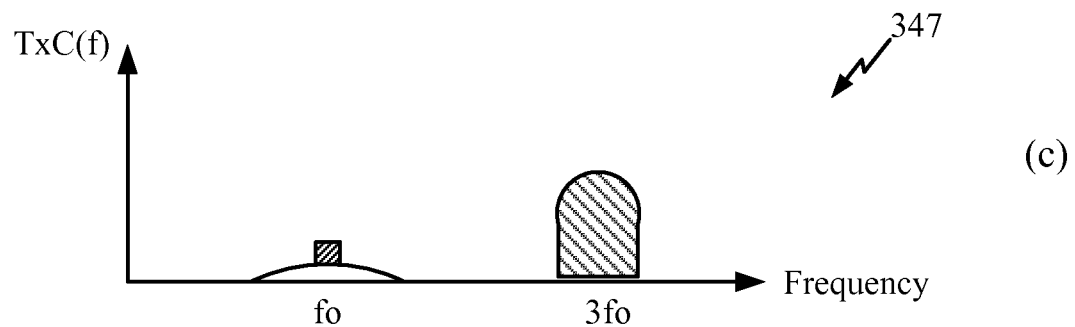

As noted above, coupler 317 may be configured as a broadband coupler (i.e., for passing all frequencies of a transmit signal) or a frequency selective filter for conveying one or more harmonics of the transmit signal. More specifically, as one example, coupler 317 may be configured as a frequency selective filter for conveying a third harmonic of transmit signal Tx to filter 340 as coupler transmit signal TxC. FIG. 7(a) is a plot 343 illustrating an example transmit signal (e.g., transmit signal Tx) in a frequency domain. As depicted in plot 343, the transmit signal includes a fundamental frequency at fo and a third harmonic at 3fo. FIG. 7(b) is a plot 345 illustrating a frequency response of coupler 317 in an embodiment wherein coupler 317 is configured for filtering the fundamental frequency at fo and passing the third harmonic at 3fo. FIG. 7(c) is a plot 347 illustrating a filtered signal (e.g., coupler TxC) conveyed by coupler 317 in the embodiment wherein coupler 317 is configured for filtering the fundamental frequency and passing the third harmonic of the transmit signal.

In a manner similar to coupler 317, coupler 360 may also be configured as a broadband coupler (i.e., for passing all signal frequencies) or a frequency selective filter for conveying one or more signal frequencies.

Figure 8:
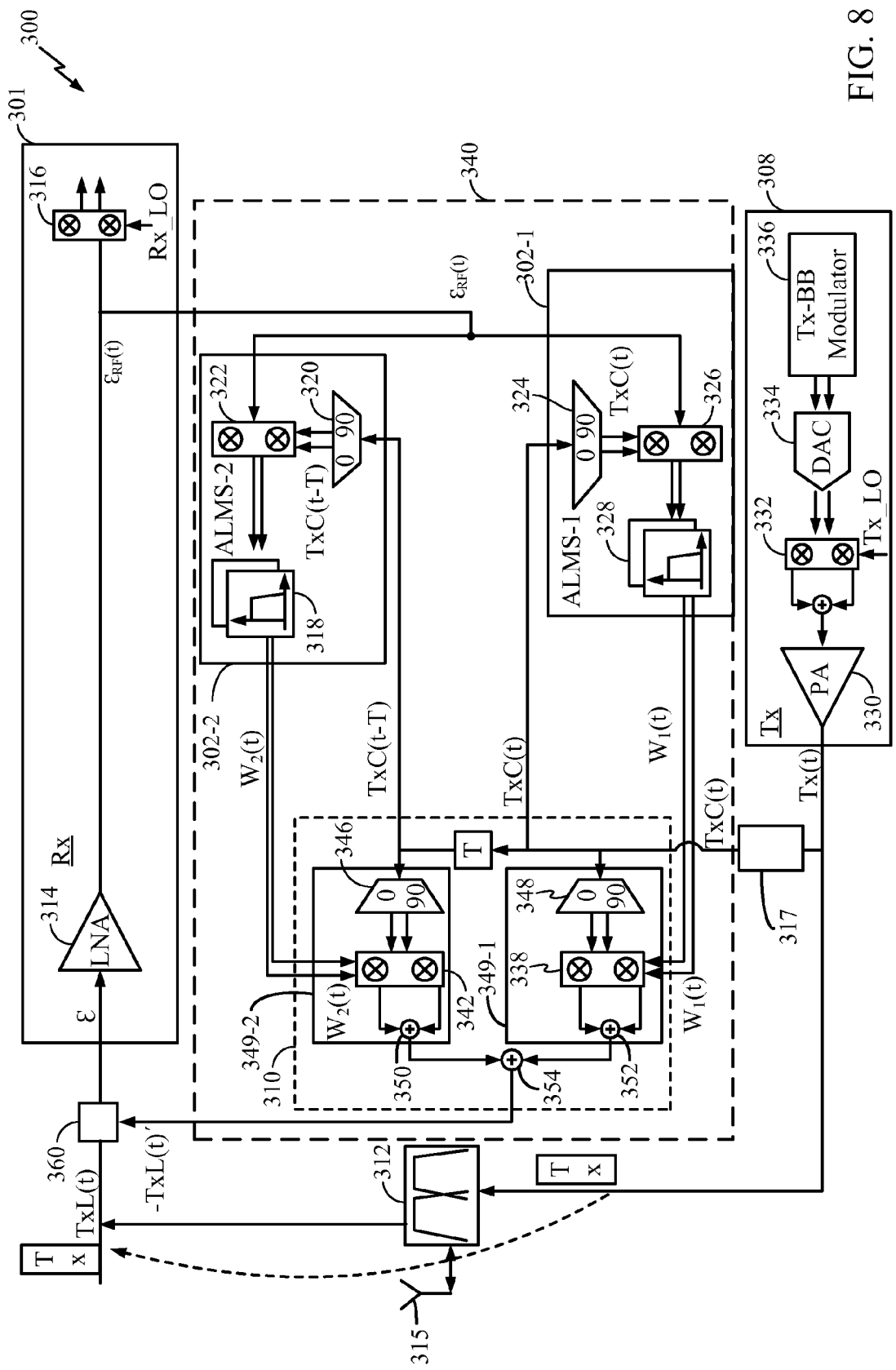
FIG. 8 is a more detailed illustration of a transceiver including a two-tap analog adaptive filter, in accordance with an exemplary embodiment of the present invention.

FIG. 8 is a more detailed illustration of transceiver 300, according to an exemplary embodiment of the present invention. Transceiver 300 includes receiver 301, transmitter 308, and adaptive filter 340. As illustrated in FIG. 8, receiver 301 includes LNA 314 and mixer 316. As will be understood by a person having ordinary skill in the art, receiver 301 may be configured to receive a signal received via antenna 315, amplify the received signal via LNA 314 and down-convert the amplified signal via mixer 316. Further, transmitter 308 includes a baseband modulator 336, a digital-to-analog converter (DAC) 334, a quadrature mixer 332, and power amplifier (PA) 330. As will be appreciated by a person having ordinary skill in the art, transmitter 308 may be configured to receive a digital signal from baseband modulator 336, convert the digital signal to an analog signal via DAC 334, up-convert the signal via quadrature mixer 332, amplify the signal via PA 330 and convey a signal to duplexer 312 for transmission via antenna 315. As will be appreciated, a portion of a transmit signal (i.e., transmit signal leakage TxL(t)) sent via the transmit path may leak through duplexer 312 to the receive path.

Transceiver 300 further includes an adaptive analog least means square (ALMS) algorithm unit 302-1, an ALMS algorithm unit 302-2, and a multi-tap filter 310. ALMS algorithm unit 302-1 may utilize an LMS algorithm to estimate the cross-correlation between signal RF error signal $\epsilon_{RF}(t)$ and an input signal provided to multi-tap filter 310 (i.e., coupler transmit signal TxC(t)). Further, ALMS algorithm unit 302-2 may utilize an LMS algorithm to estimate the cross-correlation between RF error signal $\epsilon_{RF}(t)$ and a delayed input signal provided to multi-tap filter 310 (i.e., coupler transmit signal TxC(t−T)). As will be appreciated by a person having ordinary skill in the art, adaptive filter 340 is configured to minimize the mean square error between transmit signal leakage TxL(t) (i.e., the undesired transmit signal leakage within a receive path) and an estimated transmit signal leakage, −TxL(t)', generated by adaptive filter 340.

ALMS algorithm unit 302-1 includes a quadrature splitter 324, a quadrature multiplier 326, and a filter 328, which may comprise a low-pass filter. Similarly, ALMS algorithm unit 302-2 includes a quadrature splitter 320, a quadrature multiplier 322, and a filter 318, which may comprise a low-pass filter. As will be appreciated by a person having ordinary skill in the art, quadrature splitters are configured to receive an input signal and provide an in-phase signal and a quadrature signal. The in-phase and quadrature signals respectively contain the in-phase and quadrature components of an input signal (i.e., the signal received by a quadrature splitter), with the in-phase signal leading the quadrature signal by 90°.

Multi-tap filter 310 includes quadrature splitters 346 and 348, quadrature multipliers 342 and 338, summers 350 and 352, and summer 354. Multi-tap filter 310 is configured to generate a transmit leakage signal estimate −TxL(t)'. Moreover, transceiver 300 includes coupler 360 for summing transmit leakage signal estimate −TxL(t)' with the composite signal, which may include transmit signal leakage TxL(t). It is noted that splitter 348, multiplier 338, and summer 352 may be collectively referred to as a complex multiply and add (CMA) unit 349-1. Similarly, splitter 346, multiplier 342, and summer 350 may be collectively referred to as a complex multiply and add (CMA) unit 349-2.

A contemplated operation of transceiver 300 will now be described. An RF error signal $\epsilon_{RF}(t)$, which is output from LNA 314 and may include a desired receive signal, noise, and transmit signal leakage, may be received by each of ALMS algorithm unit 302-1 and ALMS algorithm unit 302-2. Further, a coupler transmit signal TxC(t), which may comprise at least a portion of transmit signal Tx(t), may be conveyed from coupler 317 to splitter 324 and splitter 348. Additionally, coupler transmit signal TxC(t) may be time-delayed by delay element T, and, thereafter, a time-delayed version of coupler transmit signal (i.e., TxC(t−T)) is conveyed to splitter 320 and splitter 346. Upon receipt of the time-delayed coupler transmit signal TxC(t−T), splitter 320 may provide an in-phase reference signal and a quadrature reference signal to multiplier 322. In addition, splitter 346 may provide an in-phase reference signal and a quadrature reference signal to multiplier 342. Further, upon receipt of coupler transmit signal TxC(t), splitter 324 may provide an in-phase reference signal and a quadrature reference signal to multiplier 326, and splitter 348 may provide an in-phase reference signal and a quadrature reference signal to multiplier 338.

Upon receipt of an in-phase and a quadrature signal, multiplier 326 multiplies the in-phase and quadrature signals with RF error signal $\epsilon_{RF}(t)$ and conveys resulting in-phase and a quadrature signals to filter 328. Filter 328, upon receipt of the in-phase and a quadrature signals from multiplier 322, conveys a coefficient $W_1(t)$, which may also be referred to herein as a "weight", to multiplier 338. It is noted that filter 328 may pass a frequency component at baseband. Furthermore, filter 328 may perform an averaging operation, as will be appreciated by a person having ordinary skill in the art. Filter 328 is configured to perform a low-pass filtering function to remove the desired receive signal that results at the frequency offset with respect to DC as a result of multiplications with quadrature mixer 326. Further, it is noted that the low-pass filtering function is equivalent to averaging in the time domain. This time-time domain averaging is part of the cross-correlation function between RF error signal $\epsilon_{RF}(t)$ and coupler transmit signal TxC(t) needed for the weight estimations.

Upon receipt of an in-phase and a quadrature signal, multiplier 322 multiplies the in-phase and quadrature signals with RF error signal $\epsilon_{RF}(t)$ and conveys resulting in-phase and a quadrature signals to filter 318. Filter 318, upon receipt of the in-phase and a quadrature signals from multiplier 322, conveys a coefficient $W_2(t)$, which may also be referred to herein as a "weight", to multiplier 342. It is noted that filter 318 may pass a frequency component at baseband. Furthermore, filter 318 may perform an averaging operation, as will be appreciated by a person having ordinary skill in the art. Filter 318 is configured to perform a low-pass filtering function to remove the desired receive signal that results at the frequency offset with respect to DC as a result of multiplications with quadrature mixer 322. Further, it is noted that the low-pass filtering function is equivalent to averaging in the time domain. This time average is part of the cross-correlation function between RF error signal $\epsilon_{RF}(t)$ and the time-delayed version of coupler transmit signal TxC(t−T) needed for the weight estimations.

Referring now to filter 310, upon receipt of in-phase and a quadrature signals via splitter 348 and coefficient $W_1(t)$, multiplier 338 multiplies the in-phase and quadrature signal with coefficient $W_1(t)$. Multiplier 338 then conveys the resulting in-phase and a quadrature signals to summer 352. Summer 352 combines the in-phase and quadrature signals and conveys a combined signal to summer 354. Moreover, upon receipt of in-phase and quadrature signal via splitter 346 and coefficient $W_2(t)$, multiplier 342 multiplies the in-phase and quadrature signal with coefficient $W_2(t)$ and conveys resulting in-phase and a quadrature signals to summer 350. Summer 350 combines the in-phase and quadrature signals and conveys a combined signal to summer 354. Summer 354 combines the output of summer 350 and the output of summer 352 to generate an estimated transmit signal leakage −TxL(t)', which may be conveyed to coupler 360. Upon receipt of thereof, coupler 360 sums the estimated transmit signal leakage −TxL(t)' and the composite signal, which may comprise transmit signal leakage TxL(t).

It is noted that, during operation of transceiver 300, the cross-correlation value between RF error signal $\epsilon_{RF}(t)$ and a signal conveyed to multi-tap filter 310 (i.e., coupler transmit signal TxC(t) or TxC(t−T)) may decrease as transmit signal leakage is removed from RF error signal $\epsilon_{RF}(t)$. Accordingly, coefficients $W_1(t)$ and $W_2(t)$ may eventually reach a steady-state value.

It is noted that although transceiver 300 is depicted as a two tap adaptive filter, the present invention is not so limited. Rather, transceiver 300 may include any number of taps more than one. For example, transceiver 300 may include one or more additional adaptive analog least means square (ALMS) algorithm units for generating one or more additional coefficients (i.e., weights), and additional circuitry within multi-tap filter 310 for generating estimated transmit signal leakage −TxL(t)' based on coefficients $W_1(t)$ and $W_2(t)$, and any additional coefficients.

Figure 9:
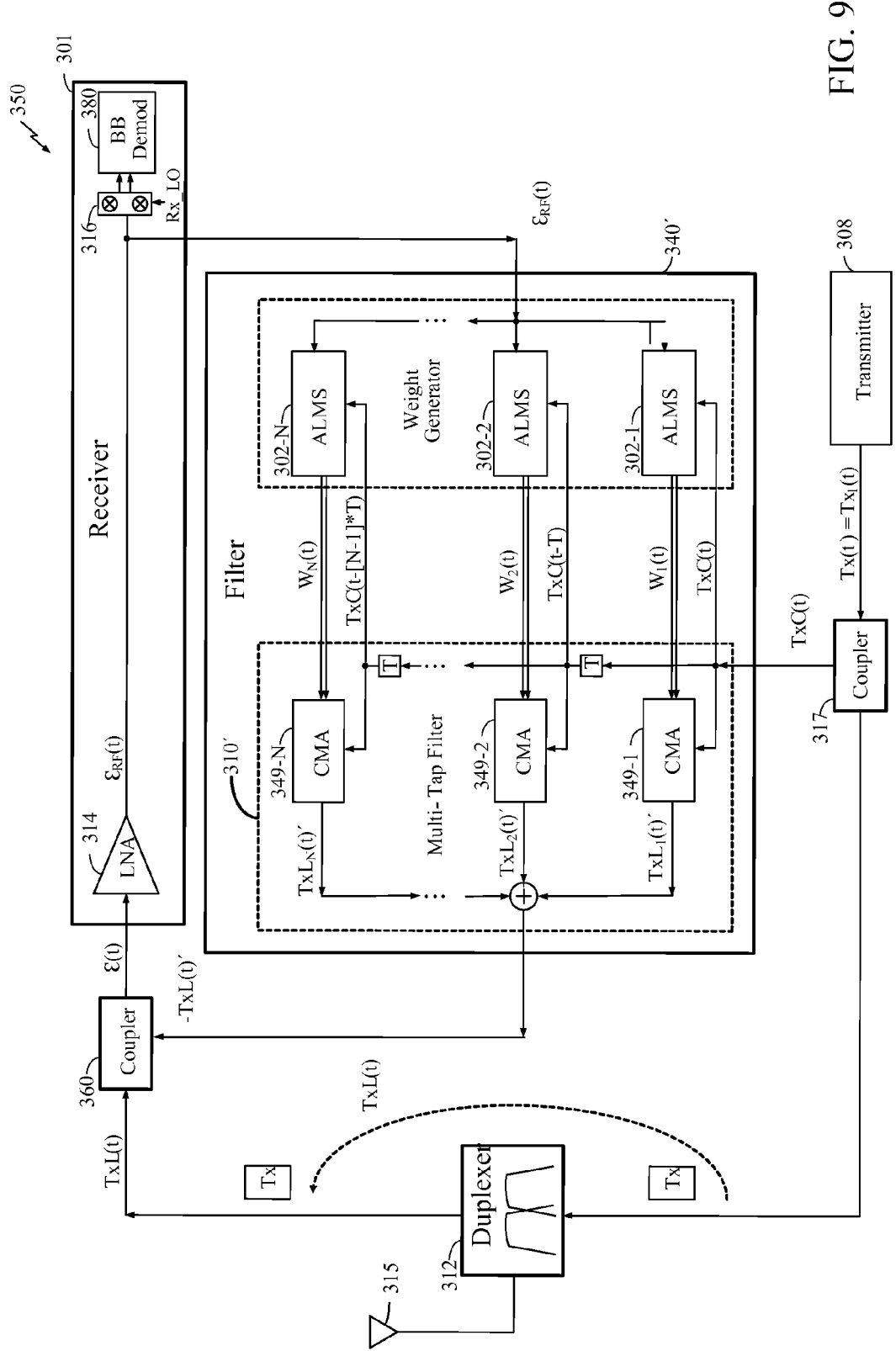
FIG. 9 is an illustration of another transceiver including a multi-tap analog adaptive filter, in accordance with an exemplary embodiment of the present invention.

FIG. 9 depicts another transceiver 350 including more than two taps. Transceiver 350 includes receiver 301, transmitter 308, and an adaptive filter 340'. Adaptive filter 340' includes adaptive analog least means square (ALMS) algorithm units 302-1-302-N and a multi-tap filter 310'. Each algorithm unit 302-1-302-N is configured to receive RF error signal $\epsilon_{RF}(t)$ and a coupler transmit signal TxC(t). It is noted that coupler transmit signal TxC(t−T) received by ALMS unit 302-2 is delayed (i.e., via a single delay element T) with respect to coupler transmit signal TxC(t) received by ALMS unit 302-1. In addition, coupler transmit signal TxC(t−[N−1]*T) received by ALMS unit 302-N is delayed (i.e., via one or more delay elements T) with respect to the portion of coupler transmit signal TxC(t−T) received by ALMS unit 302-2. It is further noted that delay elements T may comprise the same delay or different delays.

Further, each algorithm units 302-1-302-N is configured to generate a weight ($W_1(t)$-$W_{IN}(t)$) (i.e., as described above with reference to FIG. 8) and convey the weight to respective complex multiply and add units 349-1-349-N of multi-tap filter 310'. Each complex multiply and add unit 349-1-349-N is further configured to receive coupler transmit signal TxC(t) having various time delays. It is noted that coupler transmit signal TxC(t−T) received by complex multiply and add unit 349-2 is delayed (i.e., via a single delay element T) with respect to coupler transmit signal TxC(t) received by complex multiply and add unit 349-1. In addition, coupler transmit signal TxC(t−[N−1]*T) received by complex multiply and add unit 349-N is delayed (i.e., via one or more delay elements T) with respect to coupler transmit signal TxC(t−T) received by complex multiply and add unit 349-2.

Multi-tap filter 310' is configured to sum the outputs of each complex multiply and add unit 349-1-349-N to generate a transmit leakage signal estimate −TxL(t)' (i.e., −TxL(t)'=$\Sigma_{n=1}^{N}$−TxL$_n$(t)'. Moreover, transceiver 350 includes coupler 360 for summing n=1 transmit leakage signal estimate −TxL(t)' and the composite signal, which may include transmit signal leakage TxL(t).

Figure 10:
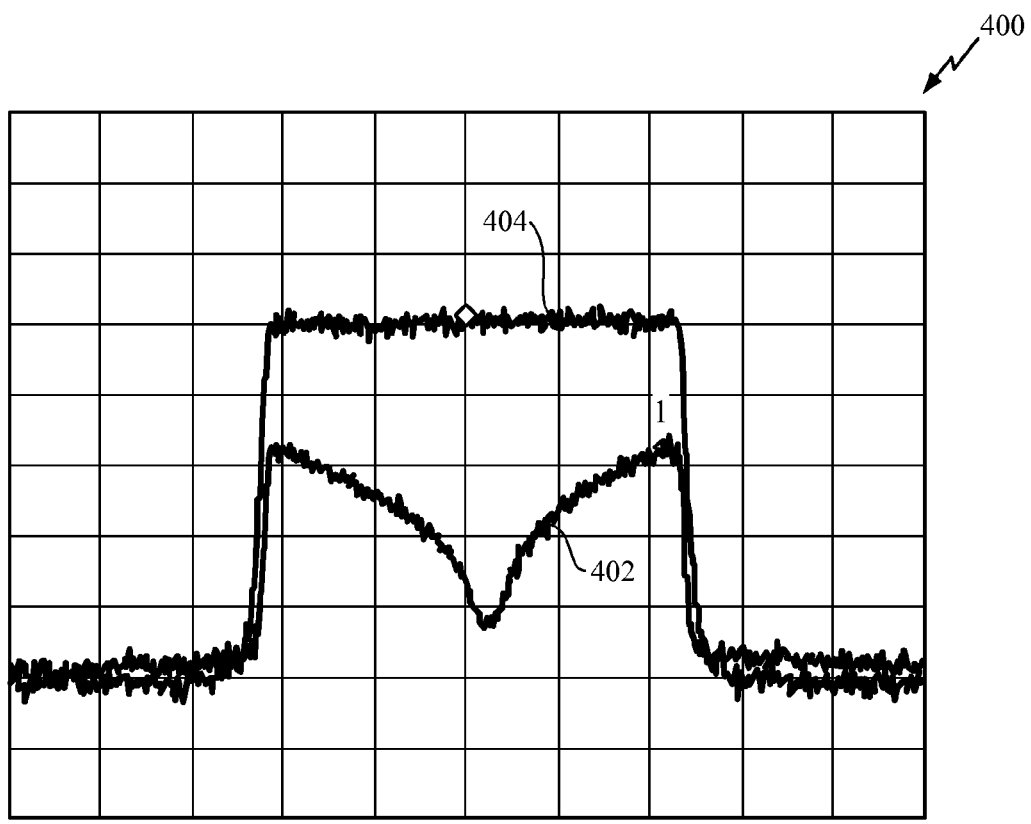
FIG. 10 is a plot illustrating transmit signal leakage cancellation results using a single-tap adaptive LMS filter.
Figure 11:
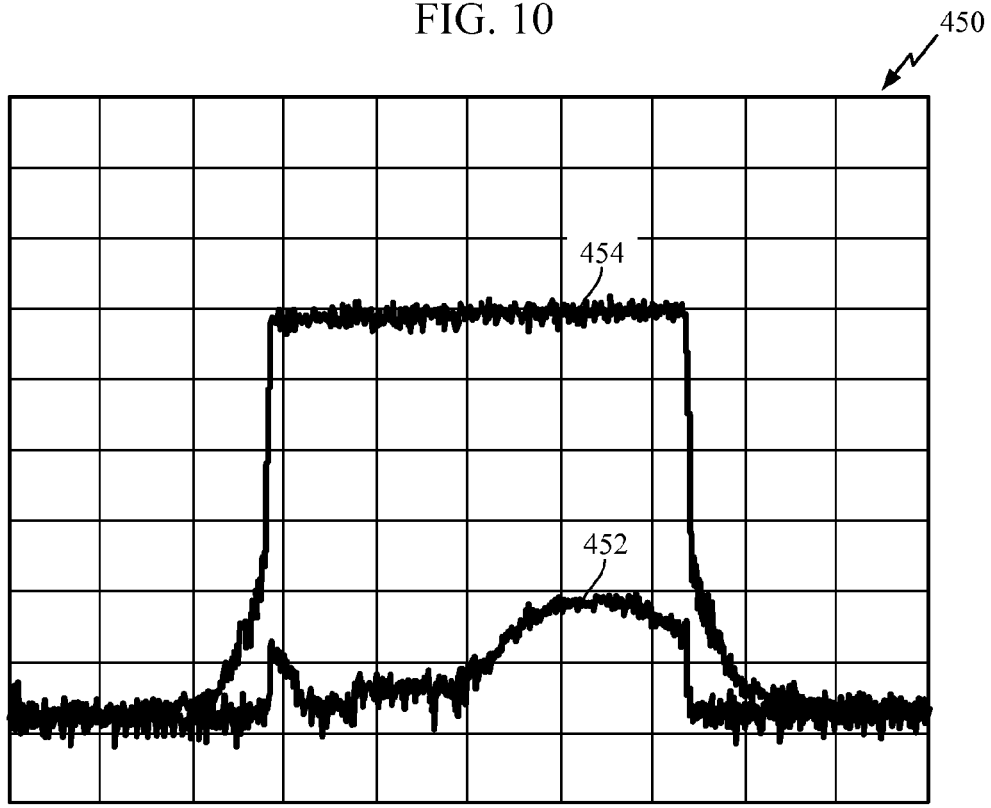
FIG. 11 is a plot illustrating transmit signal leakage cancellation results using a multi-tap adaptive LMS filter.

FIG. 10 is a plot 400 illustrating cancellation of transmit signal leakage using a single-tap filter. More specifically, waveform 404 illustrates a frequency response of transmit signal leakage in a receive path without use of a filter and waveform 402 illustrates a frequency response with the single-tap filter enabled. Further, FIG. 11 is a plot 450 illustrating cancellation of transmit signal leakage using a multi-tap adaptive LMS filter (e.g., adaptive filter 340 or adaptive filter 340'). More specifically, waveform 454 illustrates a frequency response of the transmit signal leakage in the receive path without use of a filter and waveform 452 illustrates a frequency response with the multi-tap adaptive LMS filter enabled. In comparison to a plot 400 illustrated in FIG. 10, which depicts transmit signal leakage cancellation of a single-tap LMS filter, the cancellation of transmit signal leakage depicted in plot 450 is greatly improved.

Figure 12:
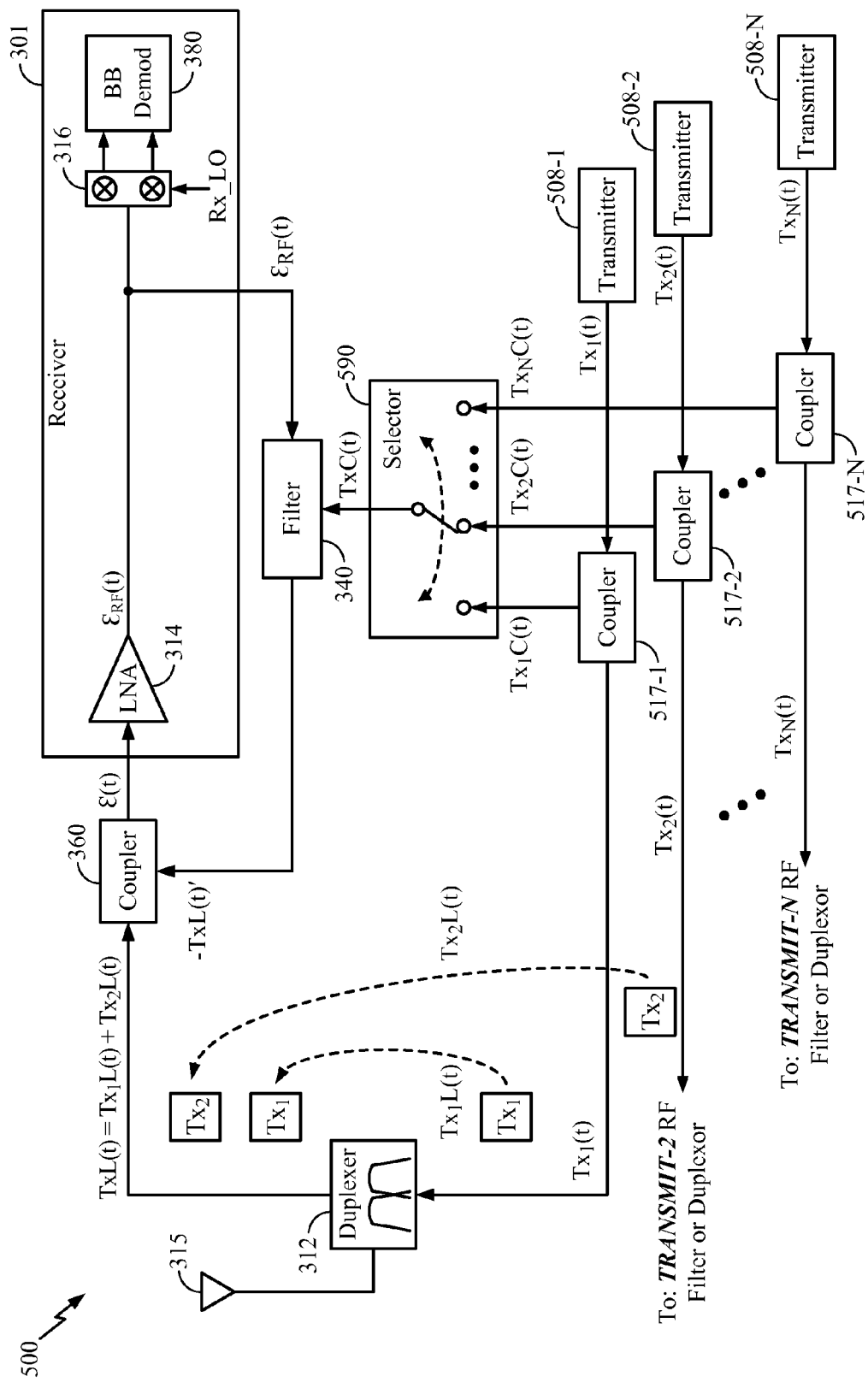
FIG. 12 illustrates another transceiver including multiple transmitters and multi-tap analog adaptive filter, according to an exemplary embodiment of the present invention.

FIG. 12 illustrates a transceiver 500 including multiple transmitters and an adaptive filter, according to an exemplary embodiment of the present invention. Similar to transceiver 300 depicted in FIG. 6, transceiver 500 includes antenna 315, duplexer 312, coupler 360, filter 340, and receiver 301. It is noted that filter 340 may also comprise filter 340' depicted in FIG. 9. Transceiver 500 further includes transmitters 508-1-508-N and a selector 590 configured for coupling one of transmitter 508-1-508-N to filter 340 via respective couplers 517-1-517-N. By way of example only, selector 590 may comprise any known and suitable switch. As a more specific example, selector 590 may comprise an RF switch. Further, it is noted that each coupler 517-1-517-N may comprise coupler 317, as described above.

As will be appreciated by a person having ordinary skill in the art, a transceiver, which includes multiple transmitters (e.g., CDMA transmitters, LTE transmitters and/or WiFi transmitters), may experience transmit signal leakage in a receive path due to one or more of the multiple transmitters. As one contemplated example, transceiver 500 may include transmit signal leakage caused by transmitters 508-1 and 508-2 (i.e., the composite signal TxL(t)=Tx$_1$L(t)+Tx$_2$L(t)). In accordance with an exemplary embodiment of the present invention, filter 340 may be configured to receive, via selector 590, a coupler transmit signal Tx$_2$C(t) for mitigating transmit signal leakage Tx$_2$L(t) due to transmitter 508-2 in a manner similar to the description above with respect to FIG. 8. Further, filter 340 may be configured to receive, via selector 590, a coupler transmit signal Tx$_1$C(t) for mitigating transmit signal leakage Tx$_1$L(t) due to transmitter 508-1 in a manner similar to the description above with respect to FIG. 8. Filter 340 may be also be configured to receive, via selector 590, a coupler transmit signal Tx$_{IN}$C(t) for mitigating any transmit signal leakage Tx$_{IN}$L(t) that may exist due to transmitter 508-N.

It is noted that transceiver 500 may be configured for mitigating transmit signal leakage TxL(t) due to more than one transmitter simultaneously. For example, in one exemplary embodiment, selector 590 may be configured for coupling a plurality of transmitters (e.g., transmitters 508-1 and 508-2) to filter 340 (i.e., via associated couplers 517), which may comprise an adequate number of taps for reconstructing a transmit leakage signal based on transmit signal leakage from the plurality of transmitters. According to another exemplary embodiment, transceiver 500 may include a plurality of adaptive filters 340 coupled in parallel, wherein one adaptive filter reconstructs a transmit leakage signal based on transmit signal leakage from a first transmitter and another adaptive filter reconstructs a transmit leakage signal based on transmit signal leakage from another transmitter.

Figure 13:
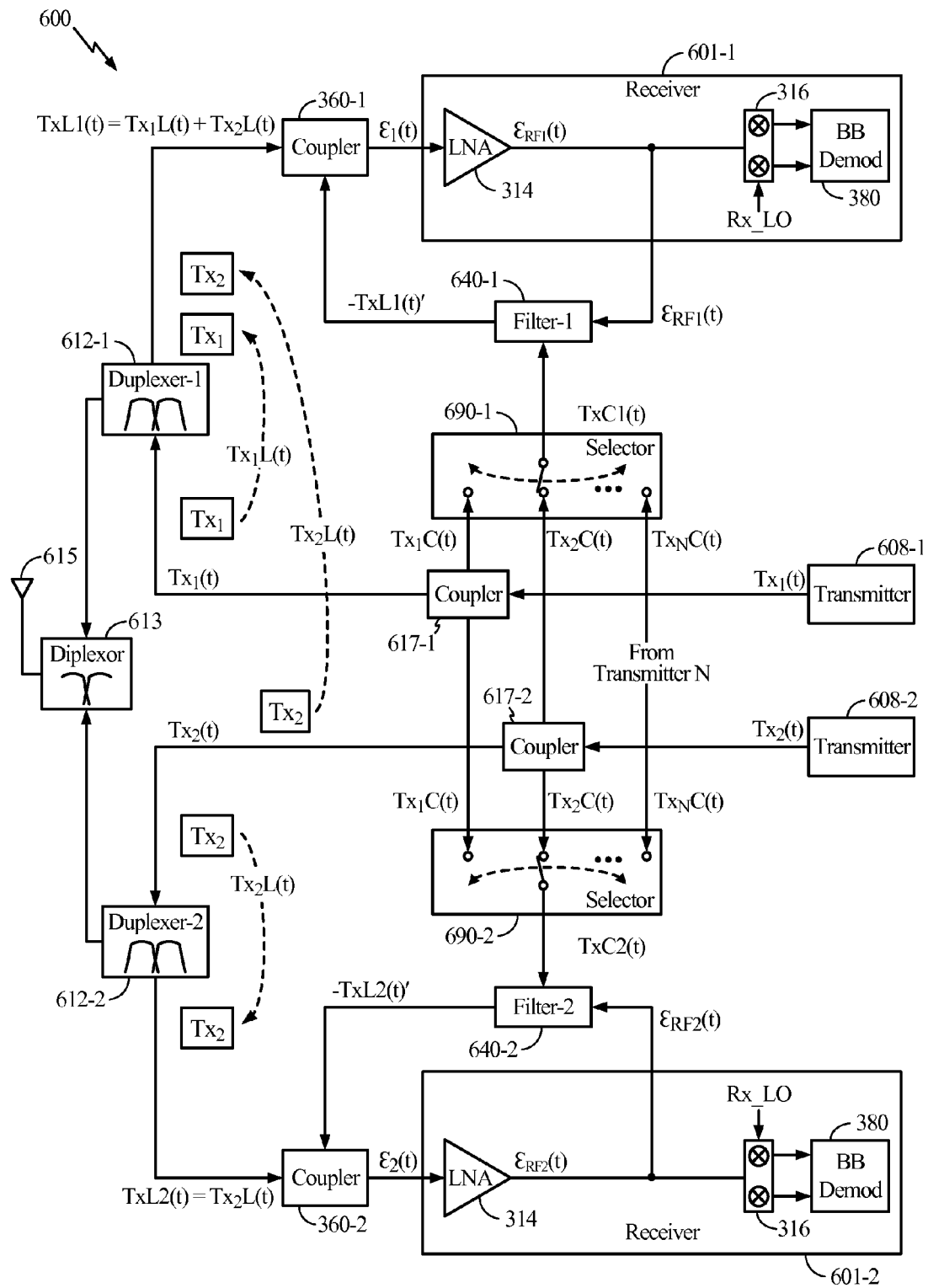
FIG. 13 illustrates another transceiver including multiple transmitters and receivers and a plurality of multi-tap analog adaptive filters, according to an exemplary embodiment of the present invention.

FIG. 13 depicts another transceiver 600 including multiple transmitters and multiple receivers coupled to antenna, and a plurality of adaptive filters, in accordance with an exemplary embodiment of the present invention. More specifically, transceiver 600 includes a transmitter/receiver pair including transmitter 608-1 and receiver 601-1 coupled to an antenna 615 via duplexer 612-1 and diplexer 613. Further, transceiver 600 includes another transmitter/receiver pair comprising transmitter 608-2 and receiver 601-2 coupled to antenna 615 via duplexer 612-2 and diplexer 613. It is noted that although transceiver 600 is illustrated as having two transmitter/receiver pairs, the invention is not so limited. Rather, transceiver 600 may include any number of transmitter/receiver pairs.

Transceiver 600 further includes selector 690-1 for coupling one of a plurality of transmitters (e.g., transmitters 608-1-608-N) to an adaptive filter 640-1, which may comprise filter 340 described above with respect to FIG. 8 or filter 340' described above with respect to FIG. 9. Further, transceiver 600 includes selector 690-2 for coupling one of a plurality of transmitters (e.g., transmitters 608-1-608-N) to filter 640-2, which may comprise filter 340 or filter 340'. Moreover, transceiver 600 includes a coupler 617-1, which may comprise coupler 317 described above with respect to FIG. 6, configured for conveying at least a portion of a transmit signal $Tx_1(t)$ (i.e., coupler transmit signal $Tx_{IN}C(t)$) from transmitter 608-1 to selector 690-1 and/or selector 690-2. In addition, transceiver 600 includes a coupler 617-2, which may comprise coupler 317, configured for conveying at least a portion of a transmit signal $Tx_2(t)$ (i.e., coupler transmit signal $Tx_2C(t)$) from transmitter 608-2 to selector 690-1 and/or selector 690-2. Further, a coupler transmit signal $Tx_{IN}C(t)$ may be conveyed from another transmitter (not shown in FIG. 13) to selector 690-1 and/or selector 690-2.

As will be understood by a person having ordinary skill in the art, a transceiver, which includes multiple transmitter/receiver pairs, may experience transmit signal leakage in one or more receive paths due to one or more of the transmitters. For example, transmitter 608-2 may cause transmit signal leakage in receiver 601-1, receiver 601-2, or both. Similarly, transmitter 608-1 may cause transmit signal leakage in receiver 601-1, receiver 601-2, or both.

As one contemplated example, a receive path including receiver 601-1 may include transmit signal leakage caused by transmitters 608-1 and 608-2 (i.e., the composite signal $TxL1(t)=Tx1L(t)+Tx2L(t)$). In accordance with an exemplary embodiment of the present invention, transceiver 600 may be configured, via selector 690-1, to couple transmitter 608-2 to filter 640-1 (i.e., via coupler 617-2) for mitigating transmit signal leakage $Tx_2L(t)$ in a first receive path (i.e., the receive path including receiver 601-1) due to transmitter 608-2 in a manner similar to the description above with respect to FIG. 8. Further, transceiver 600 may be configured, via selector 690-1, to couple transmitter 608-1 to filter 640-1 (i.e., via coupler 617-1) for mitigating transmit signal leakage $Tx_1L(t)$ in the first receive path due to transmitter 608-1 in a manner similar to the description above with respect to FIG. 8.

In addition, transceiver 600 may be configured, via selector 690-2, to couple transmitter 608-2 to filter 640-2 (i.e., via coupler 617-2) for mitigating transmit signal leakage $Tx_2L(t)$ in a second receive path (i.e., the receive path including receiver 601-2) due to transmitter 608-2 in a manner similar to the description above with respect to FIG. 8. Further, it is noted that transceiver 600 may be configured, via selector 690-2, to couple transmitter 608-1 to filter 640-2 (i.e., via coupler 617-1) for mitigating any transmit signal leakage that may exist in the second receive path due to transmitter 608-1.

Figure 14:
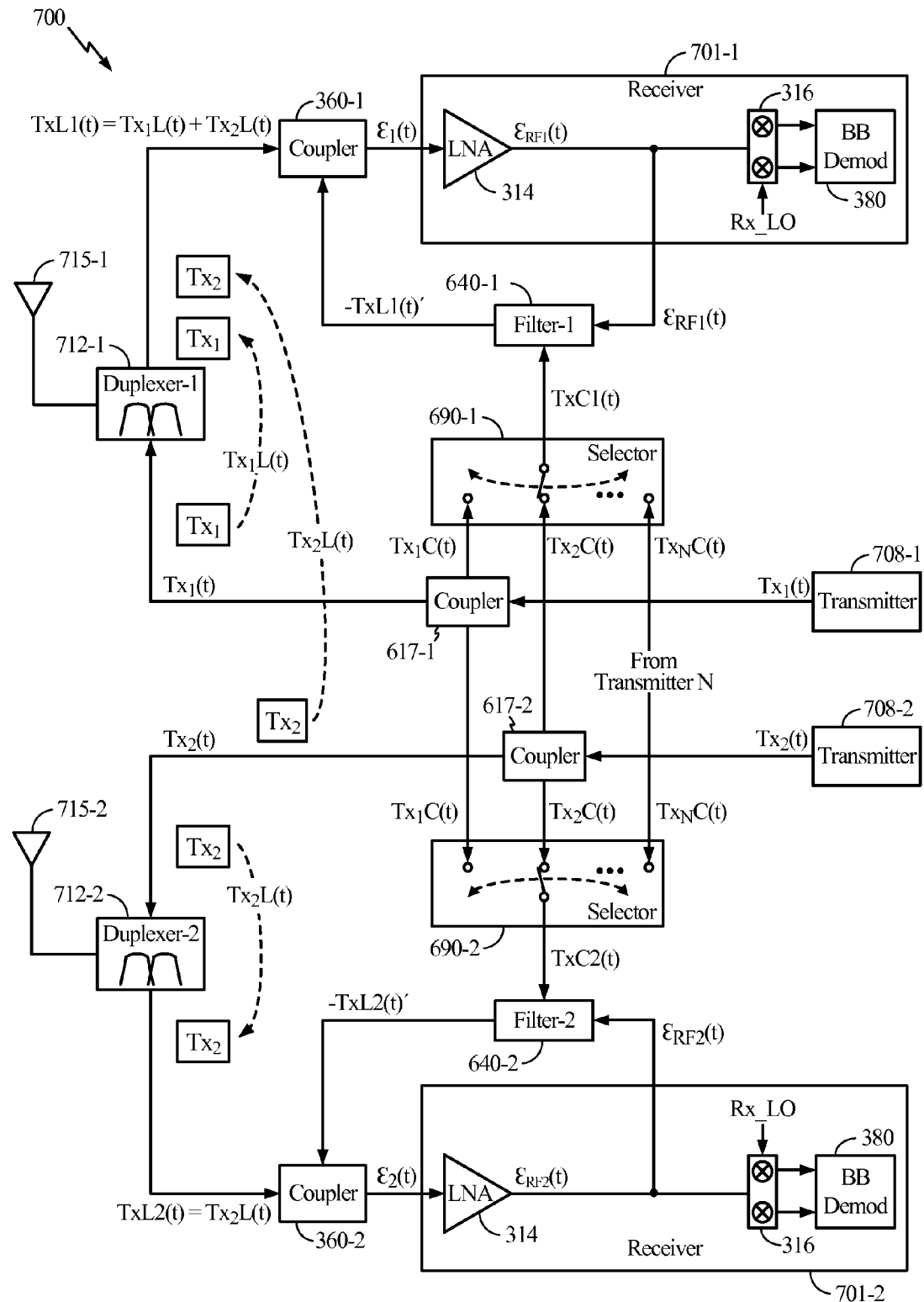
FIG. 14 illustrates yet another transceiver including multiple transmitters, receivers, and antennas, and a plurality of multi-tap analog adaptive filters, in accordance with an exemplary embodiment of the present invention.

FIG. 14 illustrates another transceiver 700 including multiple transmitters, multiple receivers, multiple receivers, and a plurality of adaptive filters, according to an exemplary embodiment of the present invention. More specifically, transceiver 700 includes a transmitter/receiver pair including transmitter 708-1 and receiver 701-1 coupled to an antenna 715-1 via a duplexer 712-1. Further, transceiver 700 includes another transmitter/receiver pair comprising transmitter 708-2 and receiver 701-2 coupled to an antenna 715-2 via a duplexer 712-2. It is noted that although transceiver 700 is illustrated as having two transmitter/receiver pairs and two antennas, the invention is not so limited. Rather, transceiver 700 may include any number of transmitters, any number of receivers, and any suitable number of antennas.

Transceiver 700 further includes selector 690-1 for coupling one of a plurality of transmitters (e.g., transmitters 708-1-708-N) to filter 640-1. Further, transceiver 700 includes selector 690-2 for coupling one of a plurality of transmitters (e.g., transmitters 708-1-708-N) to filter 640-2. Moreover, transceiver 700 includes coupler 617-1 configured for conveying at least a portion of a transmit signal $Tx_1(t)$ (i.e., coupler transmit signal $Tx_{IN}C(t)$) from transmitter 708-1 to selector 690-1 and/or selector 690-2. In addition, transceiver 700 includes coupler 617-2 configured for conveying at least a portion of a transmit signal $Tx_2(t)$ (i.e., coupler transmit signal $Tx_2C(t)$) from transmitter 708-2 to selector 690-1 and/or selector 690-2. Further, a coupler transmit signal $Tx_{IN}C(t)$ may be conveyed from another transmitter (not shown in FIG. 13) to selector 690-1 and/or selector 690-2.

As will be understood by a person having ordinary skill in the art, a transceiver, which includes multiple transmitters and receivers, may experience transmit signal leakage in one or more receive paths due to one or more transmitters. For example, transmitter 708-2 may cause transmit signal leakage in receiver 701-1, receiver 701-2, or both. Similarly, transmitter 708-1 may cause transmit signal leakage in receiver 701-1, receiver 701-2, or both.

As one contemplated example, a receive path including receiver 701-1 may include transmit signal leakage caused by transmitters 708-1 and 708-2 (i.e., the composite signal $TxL1(t)=Tx_1L(t)+Tx_2L(t)$). In accordance with an exemplary embodiment of the present invention, transceiver 700 may be configured, via selector 690-1, to couple transmitter 708-2 to filter 640-1 (i.e., via coupler 617-2) for mitigating transmit signal leakage $Tx_2L(t)$ in a first receive path (i.e., the receive path including receiver 701-1) due to transmitter 708-2 in a manner similar to the description above with respect to FIG. 8. Further, transceiver 700 may be configured, via selector 690-1, to couple transmitter 708-1 to filter 640-1 (i.e., via coupler 617-1) for mitigating transmit signal leakage $Tx_1L(t)$ in the first receive path due to transmitter 708-1 in a manner similar to the description above with respect to FIG. 8.

In addition, transceiver 700 may be configured, via selector 690-2, to couple transmitter 708-2 to filter 640-2 (i.e., via coupler 617-2) for mitigating transmit signal leakage $Tx_2L(t)$ in a second receive path (i.e., the receive path including receiver 701-2) due to transmitter 708-2 in a manner similar to the description above with respect to FIG. 8. It is noted that transceiver 700 may also be configured, via selector 690-2, to couple transmitter 708-1 to filter 640-2 (i.e., via coupler 617-1) for mitigating any transmit signal leakage that may exist in the second receive path due to transmitter 708-1.

It is noted that the transceivers illustrated in FIGS. 12-14 are only examples of transceivers including multiple transmitters and other transceiver configurations including multiple transmitters and means for mitigating transmit signal leakage in one or more receive paths of a transceiver caused by one or more transmitters are within the scope of the present invention.

Figure 15:
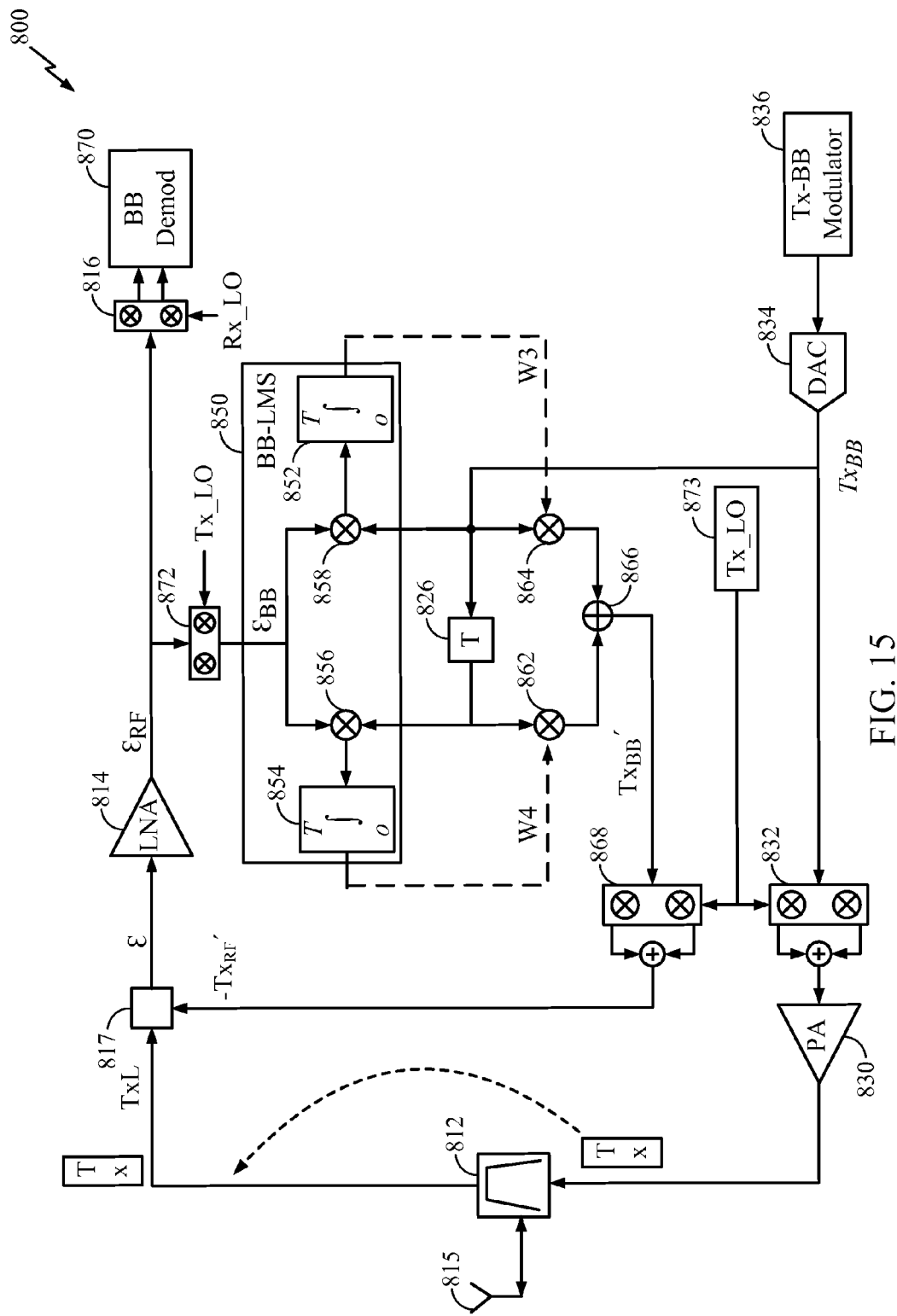
FIG. 15 is an illustration of a transceiver including a multi-tap analog adaptive filter at baseband, according to an exemplary embodiment of the present invention.

FIG. 15 illustrates another transceiver 800, in accordance with an exemplary embodiment of the present invention. In contrast to transceiver 300, which is configured to generate a transmit signal leakage estimate at radio-frequency (RF), transceiver 800 is configured to generate a transmit signal leakage estimate at baseband.

Transceiver 800 includes a receive path having an antenna 815, a duplexer 812, a low-noise amplifier (LNA) 814, a mixer 816, and a baseband demodulator 870. As will be understood by a person having ordinary skill in the art, a signal received via antenna 815 may be amplified via LNA 814, down-converted via mixer 816, and demodulated via demodulator 870. Further, transceiver 800 includes a transmit path having a baseband modulator 836, a digital-to-analog converter (DAC) 834, a mixer 832, and a power amplifier (PA) 830. Mixer 832 is configured to receive a local oscillator signal from a local oscillator 873. As will be appreciated by a person having ordinary skill in the art, a signal for transmission may be modulated via baseband modulator 836, converted to an analog signal via DAC 834, up-converted via mixer 832, amplified via PA 830 and conveyed to duplexer 812 for transmission via antenna 815. As will be further appreciated, a portion of a transmit signal (i.e., transmit signal leakage TxL), sent via the transmit path, may leak through duplexer 812 to the receive path.

Transceiver 800 further includes a mixer 872, a baseband LMS filter 850, delay element T, multipliers 862 and 864, a summer 866, and a mixer 868. Mixer 868 is configured to receive a local oscillator signal from local oscillator 873. Baseband LMS 850 includes integrators 852 and 854 and multipliers 856 and 858. As illustrated in FIG. 15, mixer 872 has an input coupled to an output of LNA 814 and an output coupled to each of multipliers 856 and 858. Integrator 854 has an input coupled to multiplier 856 and an output coupled to multiplier 862, and integrator 852 has an input coupled to multiplier 858 and an output coupled to multiplier 864. Further, delay element T is configured to receive the output of DAC 834 and output a signal, which is received by each of multipliers 856 and 862. The output of DAC 834 is also received by each of multipliers 858 and 864. In addition to receiving a signal from delay element T, multiplier 862 is configured to receive a coefficient W4 from integrator 854. Further, in addition to receiving a signal from DAC 834, multiplier 864 is configured to receive a coefficient W3 from integrator 852. It is noted that each of coefficients W3 and W4 may be referred to herein as a "weight".

A contemplated operation of transceiver 800 will now be described. A radio-frequency (RF) signal $\epsilon_{RF}$ is output from LNA 814 and may include a desired signal (i.e., the desired receive signal), noise, and transmit signal leakage TxL. RF signal $\epsilon_{RF}$ is conveyed to mixer 872 and down-converted to baseband. An output of mixer 872 (i.e., signal $\epsilon_{BB}$) is conveyed to each of multipliers 856 and 858. Further, a transmit signal at baseband (i.e., $Tx_{BB}$), which is output from DAC 834, is conveyed to multiplier 858, multiplier 864, and delay element T. Delay element T delays the transmit signal and conveys a time-delayed version of the transmit signal (i.e., $Tx(t-T)_{BB}$) to each of multiplier 856 and multiplier 862. Accordingly, a signal received by multipliers 856 and 862 is delayed with respect to a signal received by multipliers 858 and 864.

Upon receipt of signal $\epsilon_{BB}$ and the transmit signal, multiplier 858 multiplies the transmit signal at baseband (i.e., $Tx_{BB}$) with signal $\epsilon_{BB}$ and conveys an output to integrator 852. Integrator 852 integrates the received signal and outputs a coefficient W3 to multiplier 864. This operation is the cross-correlation operation needed to estimate the weights. Upon receipt of signal $\epsilon_{BB}$ and the time-delayed transmit signal, multiplier 856 multiplies the time-delayed transmit signal (i.e., $Tx(t-T)_{BB}$) with signal $\epsilon_{BB}$ and conveys an output to integrator 854. Integrator 854 integrates the received signal and outputs a coefficient W4 to multiplier 862.

Moreover, upon receipt of coefficient W3 and the transmit signal, multiplier 864 multiplies the transmit signal (i.e., $Tx_{BB}$) with coefficient W3 and conveys an output to summer 866. Further, upon receipt of coefficient W4 and the time-delayed transmit signal, multiplier 862 multiplies the time-delayed transmit signal (i.e., $Tx(t-T)_{BB}$) with coefficient W4 and conveys an output to summer 866. Summer 866, upon receiving the outputs of multiplier 862 and multiplier 864, combines the two signals and conveys a signal $Tx_{BB}'$ to mixer 834, which up-converts that signal to RF and conveys an estimated transmit leakage signal $-Tx_{RF}'$ to coupler 817. Upon receipt of thereof, coupler 817 may sum estimated transmit leakage signal $-Tx_{RF}'$ and the composite signal, which may comprise transmit signal leakage TxL.

It is noted that, during operation of transceiver 800, the cross-correlation value between signal $\epsilon_{BB}$ and a transmit signal conveyed to multi-tap filter 850 (i.e., transmit signal $Tx_{BB}$ or $Tx(t-T)_{BB}$) will decrease as transmit signal leakage is removed from signal $\epsilon_{RF}$. Accordingly, coefficients W3 and W4 may eventually reach a steady-state value.

It is further noted that although the transceiver 800 is depicted as a two tap adaptive filter, the present invention is not so limited. Rather, transceiver 800 may include any number of taps more than one. For example, baseband LMS filter 850 may include additional circuitry for generating additional coefficients (i.e., in addition to W3 and W4). Further, transceiver 800 may include additional circuitry for generating transmit leakage signal estimate $-Tx_{RF}'$ based on coefficients W3 and W4, and any additional coefficients.

Figure 16:
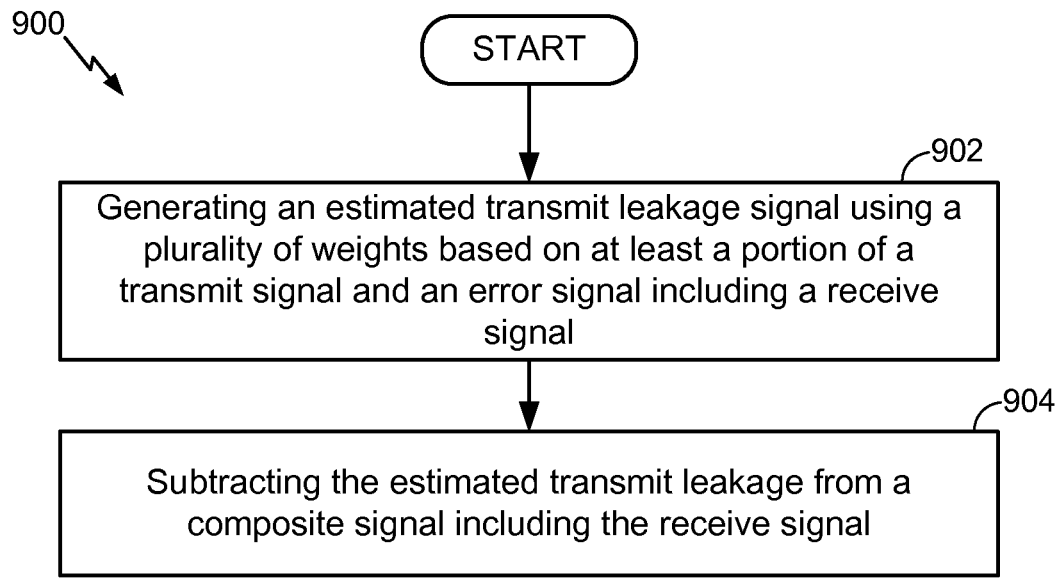
FIG. 16 is a flowchart illustrating a method, according to an exemplary embodiment of the present invention.

FIG. 16 is a flowchart illustrating a method 900, in accordance with one or more exemplary embodiments. Method 900 may include generating an estimated transmit leakage signal using a plurality of weights based on at least a portion of a transmit signal and an error signal including a receive signal (depicted by numeral 902). Method 900 may also include subtracting the estimated transmit leakage from a composite signal including the receive signal (depicted by numeral 904).

Figure 17:
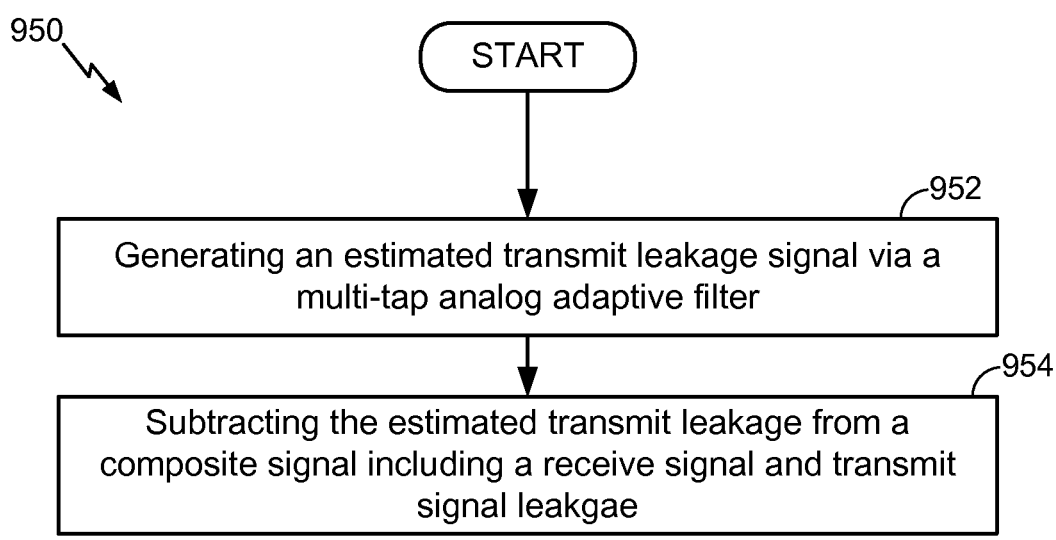
FIG. 17 is a flowchart illustrating another method, according to an exemplary embodiment of the present invention.

FIG. 17 is a flowchart illustrating another method 950, in accordance with one or more exemplary embodiments. Method 950 may include generating an estimated transmit leakage signal via a multi-tap analog adaptive filter (depicted by numeral 952). Method 950 may also include subtracting the estimated transmit leakage from a composite signal including a receive signal and transmit signal leakage (depicted by numeral 954).

Exemplary embodiments, as described herein, may mitigate the effects of transmit signal leakage. More specifically, the multi-tap adaptive filters, as described herein, may compensate for group delay distortion introduced by a duplexer or any other front-end filters. By way of example only, exemplary embodiments of the present invention may provide 15-20 dB increase in cancellation (at more than one frequency). In contrast to conventional transceivers, which may utilize a single-tap filter, the exemplary embodiments, as described herein, utilize a plurality of taps for sampling at a plurality of points (i.e., frequencies) and LMS functionality for interpolating between the points. Further, because the algorithm units described herein are LMS units, power usage of the means square error (MSE) is minimized to ensure the highest possible degree of cancellation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A transceiver, comprising:
   a transmitter;
   a receiver; and
   a multi-tap analog adaptive filter coupled to each of the transmitter and the receiver and configured to generate an estimated transmit leakage signal based on at least a portion of a transmit signal from the transmitter and an error signal from the receiver, and to convey the estimated transmit leakage signal to a coupler connected to an input of the receiver.

2. The transceiver of claim 1, the multi-tap analog adaptive filter comprising
   a plurality of least means square (LMS) algorithm units configured to generate a plurality of coefficients in response to receipt of the at least a portion of the transmit signal and the error signal.

3. The transceiver of claim 2, the plurality of LMS algorithm units comprising:
   a first LMS algorithm unit configured to generate a first coefficient of the plurality of coefficients in response to receipt of the at least a portion of the transmit signal and the error signal; and
   a second LMS algorithm unit configured to generate a second coefficient of the plurality of coefficients in response to receipt of the at least a portion of the transmit signal and the error signal.

4. The transceiver of claim 1, further comprising a coupler for summing the estimated transmit leakage signal and a composite signal including transmit signal leakage.

5. The transceiver of claim 1, the multi-tap analog adaptive filter coupled to an output of a low-noise amplifier of the receiver and an output of a power amplifier of the transmitter.

6. The transceiver of claim 1, the at least a portion of the transmit signal comprising a third harmonic of the transmit signal.

7. The transceiver of claim 1, further comprising a coupler coupled between an output of a power amplifier of the transmitter and an input of the multi-tap analog adaptive filter and configured as one of a broadband coupler and a frequency selective filter.

8. The transceiver of claim 7, the coupler configured as the frequency selective filter for conveying a harmonic of the transmit signal to the multi-tap analog adaptive filter.

9. The transceiver of claim 1, the multi-tap analog adaptive filter comprising:
   a first multiplier for multiplying the error signal and the at least a portion of the transmit signal;
   a second multiplier for multiplying the error signal and a time-delayed version of the at least a portion of the transmit signal;
   a first integrator for receiving an output of the first multiplier and generating a first coefficient; and
   a second integrator for receiving an output of the second multiplier and generating a second coefficient.

10. The transceiver of claim 9, further comprising:
a third multiplier for multiplying the first coefficient and the at least a portion of the transmit signal;
a fourth multiplier for multiplying the second coefficient and the time-delayed version of the at least a portion of the transmit signal; and
a summer for summing an output of the third multiplier and an output of the fourth multiplier.

11. A multi-tap analog adaptive filter, comprising:
a first unit for receiving an error signal from a receiver and generating a first weight based on the error signal from the receiver;
a second unit for receiving the error signal from the receiver and generating a second weight based on the error signal from the receiver;
a filter configured to generate a transmit signal leakage estimate based on a harmonic of a transmit signal, a time-delayed version of the harmonic, the first weight, and the second weight; and
a coupler for summing the transmit signal leakage estimate and a composite signal including transmit signal leakage.

12. The multi-tap analog adaptive filter of claim 11, the first unit comprising:
a quadrature splitter for receiving the harmonic;
a multiplier for receiving the error signal and an output of the quadrature splitter; and
a low-pass filter for receiving an output of the multiplier and conveying the first weight.

13. The multi-tap analog adaptive filter of claim 11, the second unit comprising:
a quadrature splitter for receiving the time-delayed version of the harmonic;
a multiplier for receiving the error signal and an output of the quadrature splitter; and
a low-pass filter for receiving an output of the multiplier and conveying the second weight.

14. The multi-tap analog adaptive filter of claim 11, the filter comprising:
a first path including a first quadrature splitter for receiving the harmonic, a first multiplier for multiplying an output of the first quadrature splitter and the second weight, and a first summer for combining in-phase and quadrature signals of the first multiplier;
a second path including a second quadrature splitter for receiving the time-delayed version of the harmonic, a second multiplier for receiving an output of the second quadrature splitter and the second weight, and a second summer for combining in-phase and quadrature signals of the second multiplier; and
a summer for combining an output of the first summer with an output of the second summer.

15. A transceiver, comprising:
a plurality of transmitters;
at least one receiver; and
a multi-tap analog adaptive filter coupled to a receiver of the at least one and configured for selective coupling to a transmitter of the plurality of transmitters, the multi-tap analog adaptive filter configured to generate an estimated transmit leakage signal based on at least a portion of a transmit signal from the transmitter selectively coupled thereto and an error signal from a receiver, and to convey the estimated transmit leakage signal a coupler connected to an input of the receiver.

16. The transceiver of claim 15, wherein the receiver for receiving a signal via a first antenna and the transmitter selectively coupled to the multi-tap analog adaptive filter is configured to either transmit a signal via the first antenna or transmit a signal via a second, different antenna.

17. The transceiver of claim 15, further comprising another multi-tap analog adaptive filter coupled to another receiver of the at least one receiver and configured for selectively coupling to another transmitter of the plurality of transmitters, the another multi-tap analog adaptive filter configured to generate another estimated transmit leakage signal based on at least a portion of another transmit signal from the another transmitter selectively coupled thereto and another receive signal from the another receiver.

18. A method, comprising:
generating an estimated transmit leakage signal using a plurality of weights based on at least a portion of a transmit signal and an error signal including a receive signal, the error signal being from a receiver;
subtracting the estimated transmit leakage from a composite signal including the receive signal to produce a resulting signal; and
conveying the resulting signal to an input of the receiver.

19. The method of claim 18, the generating an estimated transmit leakage signal using a plurality of weights comprising generating the estimated transmit leakage signal with a multi-tap least means square (LMS) analog adaptive filter.

20. The method of claim 18, the generating an estimated transmit leakage signal using a plurality of weights comprising:
generating a first weight of the plurality of weights based on the at least a portion of the transmit signal and the error signal; and
generating a second weight of the plurality of weights based on a time-delayed version of the at least a portion of the transmit signal and the error signal.

21. The method of claim 18, wherein subtracting the estimated transmit leakage from the composite signal comprises subtracting the estimated transmit leakage from the composite signal prior to amplifying the composite signal with a low-noise amplifier of a receiver.

22. A method, comprising:
generating an estimated transmit leakage signal via a multi-tap analog adaptive filter based on an error signal from a receiver;
subtracting the estimated transmit leakage signal from a composite signal including a receive signal and a transmit leakage signal to produce a resulting signal; and
conveying the resulting signal to an input of the receiver.

23. The method of claim 22, the generating comprising:
multiplying the error signal including the receive signal with a harmonic of a transmit signal to generate a first signal;
integrating the first signal to generate a first coefficient;
multiplying the error signal with a time-delayed version of the harmonic to generate a second signal;
integrating the second signal to generate a second coefficient;
multiplying the first coefficient with the harmonic to generate a third signal;
multiplying the second coefficient with the time-delayed version of the harmonic to generate a fourth signal; and
summing the third signal and the fourth signal.

24. The method of claim 22, the generating comprising:
multiplying the error signal including the receive signal with a harmonic of a transmit signal to generate a first signal;
filtering the first signal to generate a first coefficient;
multiplying the error signal with the time-delayed version of the harmonic to generate a second signal;

filtering the second signal to generate a second coefficient;
multiplying the first coefficient with the harmonic to generate a third signal;
multiplying the second coefficient with the time-delayed version of the harmonic to generate a fourth signal; and
summing the third signal and the fourth signal.

25. The method of claim 22, the generating an estimated transmit leakage signal via a multi-tap adaptive filter comprising generating the estimated transmit leakage signal via the multi-tap adaptive filter at one of radio-frequency and baseband.

26. A device, comprising:
means for generating an estimated transmit leakage signal via a multi-tap analog adaptive filter based on an error signal from a receiver; and
means for subtracting the estimated transmit leakage from a composite signal including a receive signal and transmit signal leakage to produce a resulting signal, the means for subtracting being configured to convey the resulting signal to an input of the receiver.

* * * * *